June 7, 1966  M. C. SICARD  3,254,771
MEANS FOR TREATING FLUIDS
Filed April 11, 1962  2 Sheets-Sheet 1
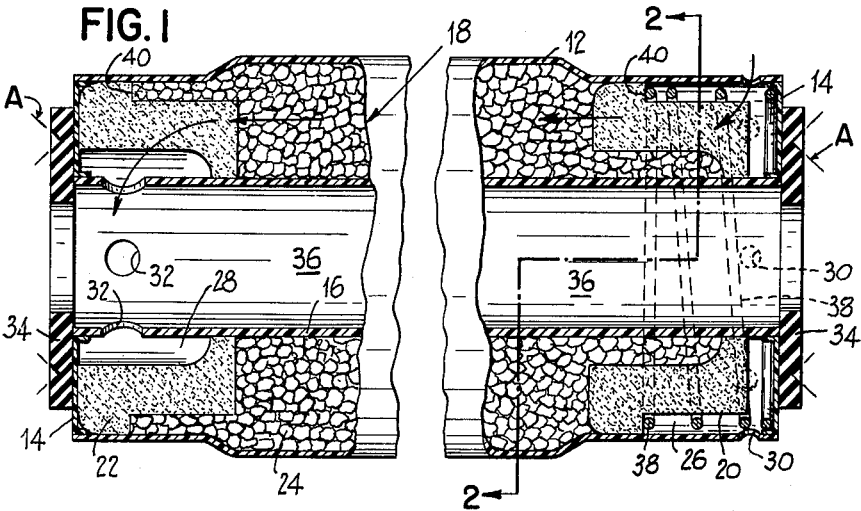
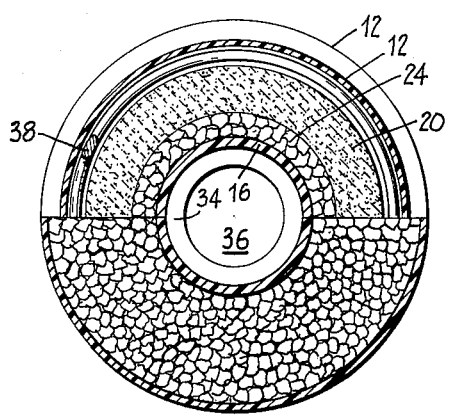
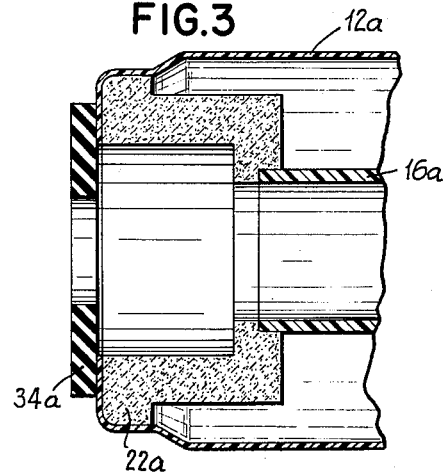
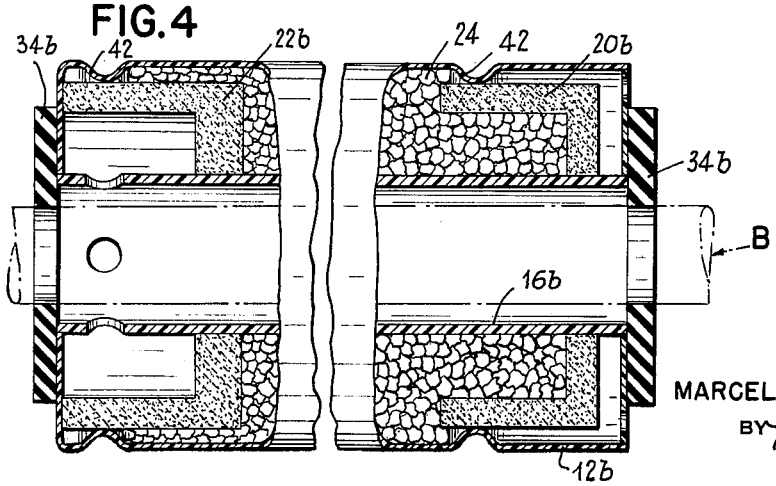
INVENTOR
MARCEL CLARENCE SICARD
BY
ATTORNEY June 7, 1966  M. C. SICARD  3,254,771
MEANS FOR TREATING FLUIDS
Filed April 11, 1962  2 Sheets-Sheet 2
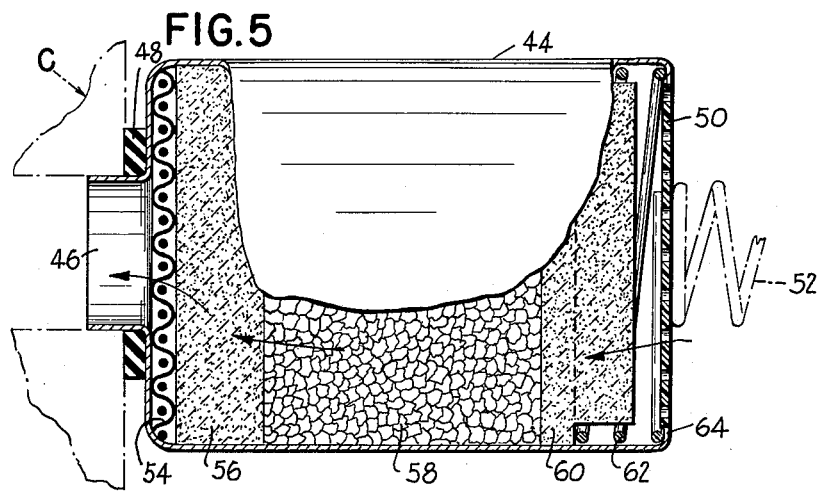
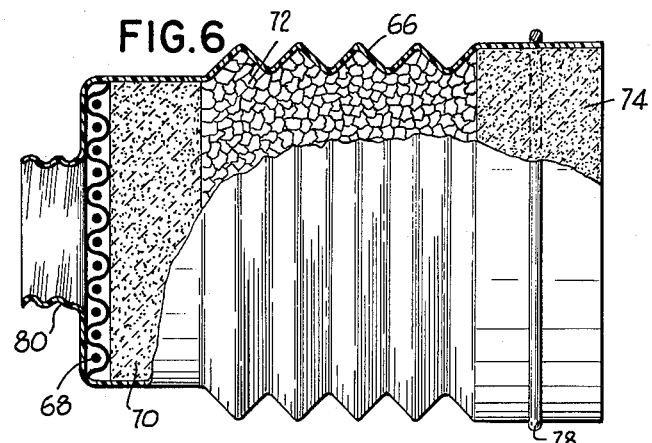
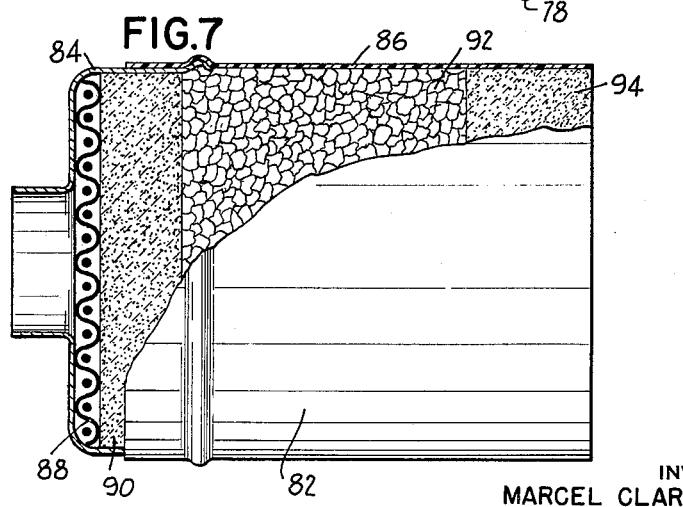
INVENTOR
MARCEL CLARENCE SICARD
BY
ATTORNEY

United States Patent Office 3,254,771
Patented June 7, 1966

3,254,771
MEANS FOR TREATING FLUIDS
Marcel Clarence Sicard, Cheshire, Conn., assignor to American Machine & Foundry Company, a corporation of New Jersey
Filed Apr. 11, 1962, Ser. No. 186,791
4 Claims. (Cl. 210—266)

The present invention relates to the treatment of fluids by passing them through a bed of material suitable for some specific purpose. One example of a treatment of this kind is the softening of water by the removal of mineral impurities achieved by causing the water to pass through a bed of ion exchange resins. Another example is the removal of obnoxious tastes and odors from water by passing it through a mass of activated carbon.

More specifically, the invention is concerned with the provision of an improved element for containing the desired chemical media, usually granular, in the form of a bed through which the fluid to be treated is caused to flow and which element comprises a unitary structure for housing in a pressure vessel.

It has been a practice to confine treating materials such as are mentioned above in a container comprising a pair of foraminous concentric cylindrical sleeves having an annular space between them for housing treating materials and having a washer at each end spanning the annulus to serve as closures therefor. Either or both of the sleeves may be used as a core on which filtering media such, for example, as cotton yarn or a woven fabric, is secured so that the complete element serves both as a filter and a fluid treating means.

Commercial structures of the kind above described are frequently made for use in a housing of known design, for example such as is shown in my U.S. Patent No. 2,966,- 990. Fluid flow is usually in a radial direction from the outside inwardly, first through the outer wall, then through the bed of treating media, and thence through the inner wall to a central cavity serving as a discharge passage connecting with the outlet part of the housing.

While a structure such as is described above is better than none, it is difficult to pack the fluid treating media (activated carbon in granular form, for instance) sufficiently tightly to prevent channeling. There is a further disadvantage because the fluid flow being radial, it affords only a short course over the media and, if due to faulty packing or erosion of the media a decrease in the density of the bed occurs at some point, resistance to flow will then be lessened and flow concentrated at that point to the detriment of the treating function of the device.

An object of my invention is to lessen the likelihood of channeling of the treating bed by simple mechanical means having no objectionable effects such as cements or binders might have.

A further object is to automatically maintain the treating bed material in a tightly packed condition whether in use or not and to prevent its breakdown by shaking or fretting which may occur in handling.

Still another object is to provide a fluid treating element wherein the treating media will be maintained substantially channel free despite diminution of its bulk in use as may be caused, for example, by erosion of its particles by flow of fluid therethrough or around.

Other objects will become apparent to those skilled in the art on examination of the following specification and claims.

Turning to the drawings, some show embodiments of the invention in the form of a thick-walled tube suited for use in a housing such as is shown in the above mentioned U.S. Patent No. 2,966,990, and these are:

FIG. 1, a side elevation, partly sectioned on the longitudinal center line;

FIG. 2, a transverse section on the line 2—2 of FIG. 1;
FIG. 3, a modification of the structure of FIG. 1;
FIG. 4, also a modification of the structure of FIG. 1.
The following figures depict other embodiments:
FIG. 5, a side elevation, partly sectioned on the longitudinal center line;
FIGS. 6 and 7, generally like FIG. 5, but each disclosing constructional variations.

All constructions employ figures of revolution and the drawings should be so interpreted.

The construction shown in FIG. 1 comprises an outer casing 12 having a pair of washer-like end caps 14 which extend radially inward to a center tube 16; these parts are preferably substantially impervious to the fluids with which they are used and have tight joints. Within the annular space 18, defined by the above recited structure, are two generally cup-shaped foraminous parts 20 and 22 which may conveniently be exactly alike and between these parts is a bed of fluid-treating media 24 which may, where water is to be treated for the removal of obnoxious flavor and odor-causing impurities such as petroleum compounds or chlorine, be activated carbon in granular form.

The cup shaped foraminous parts 20 and 22 are pistonlike fit in the space 18 with respect to the inner surface of the casing 12 and tube 16 so as to provide annular spaces 26 and 28, respectively, along these surfaces. Communicating with spaces 26 and 28, respectively, are inlet ports 30 and outlet ports 32 formed in the outer casing 12 and tube 16.

The construction as shown is adapted for use by insertion in an outer housing such as that described in my aforementioned patent, to this end, a pair of resilient gaskets 34 are shown mounted to end caps 14 to provide means for securing the construction in sealing cooperation with surfaces A of the housing in which the element is used.

In any event, the fluid being treated enters the device through ports 30 into space 26 and then flows through the wall of the first foraminous part 20, through the bed of media 24, then through the wall of the second foraminous part 22, and thence through ports 32 into the discharge passage 36 of center tube 16, all as indicated by arrows in FIG. 1.

When fluid flows through the above-described structure there is, of course, a pressure drop across each of the foraminous parts 20 and 22 and also across the bed 24 from one end to the other. Advantage is taken of this condition by making the foraminous parts 20 and 22 a sliding piston-like fit on the inner surface of casing 12 and on the outer surface of center tube 16 with the result that the pressure drop across part 20 biases it axially in the direction of the remote end of the element thus imposing a compacting load on bed 24 which transmits the said load and also that developed by its own pressure drop on to part 22 which is thus firmly held at its end of the housing. Movement of the granules of the bed 24, in respect to each other, is substantially prevented by the compacting load developed by part 20. This largely eliminates channeling in the bed. The fact that the fluid flows along the bed and not radially thereof also assists in compacting it and preventing channeling.

A suitable spring 38 may also be incorporated into the structure to bias part 20 towards part 22 and so help to compact the bed. While this spring may be redundant under most conditions, it is advantageous during periods of non-use of the device, such as in transit, and it also serves to add useful compacting load when the flow through the element is of small proportions. To further utilize the pressure drop conditions described, it is both useful and practical to make the casing 12 of a flexible plastic. It may be, for example, a blow-moulded tube having a wall about one-thirty second of an inch thick.

When this is done, the pressure drop collapses the thin wall radially inward on to the bed 24 which is supported by center tube 16 and so is further compacted and held against channeling.

In commercial practice and where the invention is to be used in the treatment of potable water, it has been found very desirable to make the casing 12, the end caps 14, and the center tube 16 of polyethylene, a thermoplastic; as the parts may be attached to each other by heatsealing, which can be likened to welding, to form a unitary structure and so avoid the use of solvents which might introduce objectionable odors or flavors.

The foraminous parts 20 and 22 may be made of any of a number of materials such as sintered metal powders, unglazed porous ceramics, moulded porous plastics, etc., but it is preferred to use accreted cellulosic material wherein the fibers are bonded together and which may readily be shaped, by moulding or cutting, to the desired form, for example, as shown in FIG. 1 with a lip 40 to slidingly engage the inner surface of casing 12 and also with uniform wall thickness. It will, of course, be seen that part 20 may be readily proportioned for use as a filter serving to prevent access of solid matter, etc., to the bed and avoiding its being contaminated. This lengthens the service life of the bed. The same filtering quality is desirable in part 22 where it serves to prevent any of the bed material passing out of the structure and results in the device being serviceable as both a chemical treating means and a filter. There is further advantage in the use of the above-mentioned accreted cellulosic material as it is somewhat resilient and readily conforms with mating surfaces.

FIG. 3 shows a modification of the construction depicted in FIG. 1. Here the foraminous part 22a is similar to part 22 of FIG. 1 but serves the additional function of supporting one end of the center tube 16a. This results in some manufacturing economies but does not change the operation of the device. Outer casing 12a is of one piece. It, and gasket 34a, function in the same way as the equivalent structures of FIG. 1.

FIG. 4 depicts a modified form of casing 12a, having narrow beads 42 which extend radially inward for contact with the outer walls of foraminous parts 20b and 22b which have the same functions as parts 20 and 22 but are without the lip 40. The form of casing here shown is particularly suitable for employment when made with thin walls by blow moulding. The arrangement of supporting the center tube shown in FIG. 3 may be utilized with this construction if desired.

It should be noted that the gaskets 34b are shown extending inwardly of the center tube 16b. This makes it possible to use the device in a housing where it has to sealingly engage a hollow discharge post such as is indicated at B by broken lines in FIG. 4.

The device disclosed in FIG. 5 is suited for use in pressure vessel in which it would be seated against the vessel's discharge port by spring pressure. The broken lines C indicate part of a vessel of that type.

The container 44 is made of any suitable material; for example, sheet metal or a moulded synthetic plastic. It has a discharge neck 46 and a gasket 48 for sealing engagement with the vessel C. A perforate cover 50 affords an abutment for the vessel's spring 52, also shown in broken lines. Within the container is a drainage disc 54 which may be of woven wire screen, a filter unit 56, a bed of fluid treating media 58 and another filter unit 60; a compression spring 62 positioned between the unit 60 and the container's lip 64 may be used if desired to impose a continuous compacting force on the bed 58. The direction of fluid flow is as indicated by the arrows.

The filter units 56 and 60 may, as in the case of the previously explained constructions, be made of any suitable material and should be a close fit on the walls of container 44 to prevent by-passing. The unit 60 should also be slideable within the container so as to be urged upon the bed 58 by the force developed from its resistance to the through-flow of fluid being treated. The unit 56 need only be so fine as to retain the products of any breakdown of the bed material and the drainage disc is provided to afford drainage from the whole discharge area of the unit. As an alternative to the provision of a drainage disc, one could make the end of container 44 with ribs. This variation of the structure is so simple as to need no drawing.

The arrangement shown in FIG. 6 is essentially that of FIG. 5 but here the container 66 may well be of a moulded flexible synthetic material. The drainage disc 68, the filter unit 70, and the media bed 72 are identical in function with their counterparts of FIG. 5 but the filter unit 74 at the inlet end of the assemblage does not slide to compact the bed. Instead, the convoluted portion of the walls of the container is collapsible both axially and, at least to some extent, radially for compacting purposes. This eliminates the need for making the unit 74 a very good fit as it may be adhered to the walls by cement or heat sealing or, alternatively, by the use of a constrictor such as a tightly tied string or rubber band 78. The discharge neck 80 may be threaded as shown to provide means of attaching the assemblage in a suitable pressure vessel.

A variant of the construction of FIG. 6 is shown in FIG. 7. Here the container 82 is made of two parts—a base 84 and a wall 86. The other parts, drainage disc 88, filter unit 90, and bed 92, and filter unit 94 are exactly similar to their counterparts in FIG. 6. The container wall 86, however, is a simple piece of flexible tube adhered at each end to its mating parts. Alternatively, it may be a resilient elastic tube such as india rubber and be self securing to its mating parts by constriction.

From the foregoing, it will be seen that a fluid treating device is made wherein increases in the flow rate therethrough with a coincidental increase in pressure drop actually aid in compacting the bed of treating media instead of tending to disrupt it as is common in prior art structures. It will also be seen that the bed may be held against disturbance by very simple mechanical means and that the foraminous bed retaining means comprise a pair of unitary filter members susceptible of adaptation to such varying requirements without complication of the overall structure or its assembly.

In some cases it would be convenient and practical to eliminate the foraminous part 22 at the discharge end of the media bed 24 and proportion the outlet ports 32 so that they serve as a substitute for it. This arrangement is not shown in the drawings as it is obvious once it has been described in words.

In some cases, as for example where the element is to be backwashed during the regeneration of ion-exchange resin treating beds, it is desirable for the part 22 to be secured against movement. This may be done in any convenient way, such as making it a press fit in the casing 12, or by cementing it in place; so as to prevent it from following the bed should the latter be moved somewhat by reverse flow fluids.

It will thus be seen that the objects set forth above, and those made apparent from the preceding description, are efficiently attained. As various changes may be made in the form, construction and arrangement of the parts herein without departing from the spirit and scope of the invention and without sacrificing any of its advantages, it is to be understood that all matter herein is to be interpreted as illustrative and not in a limiting sense.

What I claim is:

1. In fluid treating apparatus of the type described, a cartridge for use in a pressure vessel by location flow-wise between an inlet orifice and an outlet orifice thereof; comprising a pair of tubular flexible walls one enveloping the other and defining an annulus therebetween, end caps secured at opposite ends of said walls to close said annulus, said tubular walls being formed with openings at each end adapted to communicate respectively with said inlet and outlet orifices, a pair of flow resistant piston-like filter members located within said annulus between said openings, a bed of granular fluid treating media disposed between said filter members, said filter members engaging surfaces of each of said walls to permit flow of fluid only serially through said filter members and said bed, at least one of said filter members being movable axially of said walls while maintaining contact therewith and applying a compacting force on said media bed as a result of its resistance to the flow of fluid through said cartridge.

2. The cartridge in accordance with claim 1 wherein the openings adapted to communicate with the inlet orifice are located adjacent one end of the outer tubular wall and wherein said movable filter member is located adjacent said last mentioned openings.

3. The cartridge in accordance with claim 1 including resilient means adapted to act upon said movable member for causing said movable member to normally impose a compacting force upon said media bed.

4. The cartridge in accordance with claim 1 wherein said filter members are provided with inner and outer annular surfaces engaging respectively the outer and inner surfaces of the wall members.

References Cited by the Examiner
UNITED STATES PATENTS

| | | | |
|---|---|---|---|
| 1,585,113 | 5/1926 | Robert | 55—513 X |
| 2,063,086 | 12/1936 | FitzGerald | 210—282 |
| 2,072,393 | 3/1937 | Briggs | 210—350 X |
| 2,742,155 | 4/1956 | Sather | 210—350 X |
| 2,773,601 | 12/1956 | Keller et al. | 210—266 |
| 2,988,222 | 6/1961 | Hagdahl | 210—350 |

REUBEN FRIEDMAN, *Primary Examiner.*

HERBERT L. MARTIN, *Examiner.*

S. ZAHARNA, *Assistant Examiner.*